United States Patent Office 2,894,045
Patented July 7, 1959

2,894,045

PRODUCTION OF CHLORINATED ETHYLENE

Edmond G. Carley, Niagara Falls, and Jesse M. Wainscott, Lewiston, N.Y., assignors to E. I. du Pont de Nemours and Company, Wilmington, Del., a corporation of Delaware No Drawing. Application April 25, 1957
Serial No. 654,992

7 Claims. (Cl. 260—654)

This invention relates to the production of chlorinated olefin degreasing solvents. It relates specifically to the production of trichlorethylene and perchlorethylene.

Chlorinated olefin degreasing solvents are commonly manufactured by preparing polychloralkanes containing at least one hydrogen atom and dehydrohalogenating to the desired product. Trichlorethylene is normally produced by chlorinating acetylene to give tetrachlorethane which yields the unsaturated product with loss of hydrogen chloride. Perchlorethylene is prepared by splitting hydrogen chloride from pentachlorethane obtained by the chlorination of trichlorethylene. In the aforesaid preparations ferric chloride is often employed as a catalyst in the chlorination step. Dehydrohalogenation may be accomplished by treating with an alkali, preferably a slurry of calcium hydroxide or by vapor phase pyrolysis. The pyrolysis process is definitely advantageous where by-product hydrogen chloride is needed. However, when this procedure is employed, serious operating problems are encountered, which result in high equipment maintenance cost, reduced yields, and the by-product hydrogen chloride is contaminated with undesirable impurities.

It is an object of this invention to provide an improved process for the production of chlorinated olefin degreasing solvents by the thermal dehydrohalogenation of polychlorethanes prepared by chlorination reactions employing ferric chloride as a reaction catalyst. It is a further object of this invention to provide an improved process for the production of trichlorethylene by the dehydrohalogenation of tetrachlorethane containing ferric chloride and other impurities. It is a still further object of this invention to provide a dehydrohalogenation process for preparing chlorethylene degreasing solvents by the pyrolysis of chlorethanes which yields pure by-product hydrogen chloride. Other objects of the invention will be apparent from the following description.

It has been discovered that the above objects may be accomplished by a process which comprises thorough dispersion of the crude polychlorethane with water, dehydrating the treated chlorethane by distillation, vaporizing the resultant product and subjecting the vapors to thermal dehydrohalogenation at a temperature of about 500° C. The term "thorough dispersion" as used in this application is equivalent to the formation of an unstable emulsion. To secure satisfactory results in this process, the water treatment of the crude polychlorethane must be sufficient to reduce its ferric chloride content to 50 parts per million or less by weight. A reduction to 20 parts per million by weight is preferred. This treatment is not a simple extraction of ferric chloride since some impurities are removed as a result of chemical reaction with water. Accordingly, the advantages that accrue are much greater than would be expected from simple extraction of water-soluble impurities. However, the ferric chloride content of the treated product gives a satisfactory measure of the efficiency of the treatment.

In the preferred practice of this invention in the preparation of trichlorethylene, the crude tetrachlorethane is thoroughly contacted by dispersion with water while maintaining a 10:1 to 1:1 weight ratio of tetrachlorethane to water, the preferred ratio being about 6:1. The treated product is then fed into a decanter in which it is separated from the water phase. In this treatment, a mixture of carbonaceous material containing a small amount of silica gradually builds up at the water interface and has to be removed by periodic purging. This silica is believed to result from the hydrolysis of silicon tetrachloride traces of which are often present in the technical chlorine employed in tetrachlorethane production. The purified tetrachlorethane leaving the decanter contains no suspended solids or dissolved silica compounds and is fed to a distillation column from which water and low boilers are removed as an overhead product. The dehydrated bottom product is then fed to a vaporizer from which it proceeds to the thermal dehydrohalogenation reactor in which the gas is maintained at a temperature of about 500° C. The cracked gases are condensed yielding trichlorethylene and by-product hydrogen chloride.

Prior to utilizing the procedure involving the washing and drying steps of this invention, solids suspended in the crude tetrachlorethane were removed by allowing the crude material to settle in a large tank and then decanting the clear liquid. This liquid was then fed to the vaporizer and dehydrohalogenation reactor where it quickly built up a film containing carbonaceous material and ferric chloride which lowered the heat transfer coefficient of the equipment. Accordingly, this apparatus had to be cleaned periodically in order to maintain satisfactory processing conditions. The settling tank also required periodic cleaning and deteriorated rapidly due to acid corrosion. The hydrogen chloride obtained was found to contain impurities which led to the formation of a siliceous deposit on vessels in which it was employed for chemical reactions. Attempts at removing the solid impurities suspended in the crude tetrachlorethane by filtration or by centrifuging were not successful. The slimy nature of the impurities made filtration impossible and their corrosive action resulted in leaks in centrifuge seals which could not be tolerated.

The following illustrates the subject invention but is not to be construed as limiting it.

*Example*

Crude tetrachlorethane prepared by the chlorination of acetylene in the presence of ferric chloride was found by analysis to contain approximately 0.3% ferric chloride. This material was fed into a 1-inch single suction centrifugal pump with a 6¾ inch diameter open overhung impeller running at 1435 r.p.m. Water and the tetrachlorethane were fed to the pump at rates varying from 1 to 3 gallons per minute. The tetrachlorethane flow was maintained at one gallon per minute while the water rate was varied from 1.0 to 0.1 gallon per minute. Under these conditions the ferric chloride content of the washed tetrachlorethane ranged from 3 to 50 p.p.m. The combined stream from the pump was then fed to a 5 gallon settling tank. Water was decanted from the top of this tank and tetrachlorethane was removed from the bottom. Tetrachlorethane treated in this way can be economically freed of water and low boilers by distillation, vaporized and dehydrohalogenated at approximately 500° C. to yield trichlorethylene and pure by-product hydrogen chloride.

It will be at once obvious that the invention of this application can be subjected to numerous variations without departing from the spirit thereof. A continuous decanter has been employed to separate the treated solvent from the aqueous phase. Special high speed dispersion equipment may also be utilized for the extraction step. The procedure is readily applied to the preparation of perchlorethylene from pentachlorethane produced by the chlorination of trichlorethylene in the presence of ferric chloride. It may also be adapted to the preparation of mixtures of trichlorethylene and perchlorethylene from tetrachlorethane-pentachlorethane mixtures.

Having described our invention, we claim:

1. The process for the production of trichlorethylene from tetrachlorethane produced by the chlorination of acetylene in the presence of ferric chloride comprising: (1) removal of soluble and insoluble impurities by reducing the ferric chloride content of the tetrachlorethane to 50 p.p.m. or less by thorough dispersion with water followed by separation of the non-aqueous phase, (2) drying the treated tetrachlorethane and simultaneously freeing it of volatile impurities by distillation, (3) vaporizing and dehydrohalogenating the dry tetrachlorethane from step 2 by heating at about 500° C. and (4) separating the trichlorethylene and by-product hydrogen chloride produced on step 3.

2. The process of claim 1 in which the ferric chloride content of the tetrachlorethane is reduced to not more than 20 p.p.m. in step 1.

3. The process for the production of trichlorethylene and perchlorethylene from a mixture of tetrachlorethane and pentachlorethane produced by the simultaneous chlorination of acetylene and trichlorethylene in the presence of ferric chloride, said process comprising: (1) removal of soluble and insoluble impurities by reducing the ferric chloride content of the mixed chloralkanes to 50 p.p.m. or less by thorough dispersion with water followed by decantation of the non-aqueous phase, (2) drying the treated chloralkanes and simultaneously freeing them from volatile impurities by distillation, (3) vaporizing and dehydrohalogenating the chloralkanes by heating at about 500° C. and (4) separating the chlorethylenes produced from by-product hydrogen chloride.

4. The process of claim 3 in which the ferric chloride content of the mixed chloralkanes is reduced to less than 50 p.p.m. by thorough dispersion with water in a centrifugal suction pump using a chloralkane:water feed in the weight ratio of about 6:1 followed by separation of water by decantation.

5. The process of claim 4 in which the ferric chloride content of the mixed chloralkanes is reduced to not more than 20 p.p.m.

6. In the production of a chlorinated ethylene selected from the group, consisting of trichlorethylene, perchlorethylene and mixtures thereof, by the thermal dehydrochlorination of a crude polychlorethane selected from the group consisting of tetrachlorethane, pentachlorethane and mixtures thereof produced by catalytic chlorination in the presence of ferric chloride, the steps comprising removal of impurities by reducing the ferric chloride content of the polychlorethane to 50 p.p.m. or less by thorough dispersion with water followed by separation of the water phase, drying the treated polychlorethane and simultaneously freeing it of volatile impurities by distillation and thereafter subjecting the polychlorethane to thermal dehydrochlorination.

7. The process of claim 6 in which the ferric chloride content of the polychlorethane is reduced to 20 p.p.m. or less by dispersion with water for removal of impurities.

References Cited in the file of this patent

UNITED STATES PATENTS

| 985,528 | Hoefer et al. | Feb. 28, 1911 |
| 1,030,916 | Ornstein | July 2, 1912 |
| 2,610,215 | Vanharen | Sept. 9, 1952 |

FOREIGN PATENTS

| 121,381 | Australia | May 9, 1946 |
| 523,228 | Canada | Mar. 27, 1956 |